United States Patent
Budd (10) Patent No.: US 10,829,175 B2
(45) Date of Patent: Nov. 10, 2020

(54) STORAGE COMPARTMENT FOR MOTORCYCLE

(71) Applicant: Cache & Carry Concealed Compartments, Corp., Peach Bottom, PA (US)

(72) Inventor: Dale D. Budd, Peach Bottom, PA (US)

(73) Assignee: Cache & Carry Concealed Compartments, Corp., Peach Bottom, PA (US)

( * ) Notice: Subject to any disclaimer, the term of this patent is extended or adjusted under 35 U.S.C. 154(b) by 0 days.

(21) Appl. No.: 16/007,044

(22) Filed: Jun. 13, 2018

(65) Prior Publication Data

US 2019/0084637 A1    Mar. 21, 2019

Related U.S. Application Data

(60) Provisional application No. 62/561,230, filed on Sep. 21, 2017.

(51) Int. Cl.
| | |
|---|---|
| *B62J 1/00* | (2006.01) |
| *B62J 9/20* | (2020.01) |
| *F16B 21/09* | (2006.01) |

(52) U.S. Cl.
CPC ................. *B62J 9/20* (2020.02); *F16B 21/09* (2013.01)

(58) Field of Classification Search
CPC .................................. B62J 9/001; B62J 9/00
See application file for complete search history.

(56) References Cited

U.S. PATENT DOCUMENTS

| 2,527,433 | A | * | 10/1950 | La Rochelle | ............... B62J 9/00 224/423 |
| 4,542,839 | A | * | 9/1985 | Levine | ....................... B62J 7/06 224/417 |
| 5,324,115 | A | * | 6/1994 | Weinreb | ............... A45C 7/0068 190/103 |
| 5,996,865 | A | | 12/1999 | Bissey | |
| 6,533,339 | B1 | | 3/2003 | Bettin et al. | |
| 6,766,931 | B2 | * | 7/2004 | Wolf | ..................... B62B 3/1464 224/411 |

(Continued)

OTHER PUBLICATIONS

Author Unknown; Case Club 2 Pistol Holder .50 Cal. Ammo Can Foam; advertisement on Amazon, date unknown; https://www.amazon.com/Case-Club-Pistol-Pre-cut-Military/dp/B00K8GWRYI.

(Continued)

*Primary Examiner* — Derek J Battisti
(74) *Attorney, Agent, or Firm* — Howson & Howson LLP (57) ABSTRACT

A compartment for containing a handheld article, is secured to the motorcycle frame and located on one side of the motorcycle and below the level of the seat. The compartment has a hinged closure on its top surface, and is positioned and configured to allow the rider to open the closure and remove articles while mounted and in motion. The hinge for the closure is located adjacent an edge of the top surface of the compartment so that the edge of the closure opposite the hinge moves upward and away from the motorcycle frame when the closure is opened. The closure readily clears the seat as it is opened, and can move past a vertical condition so that it can remain open. The interior of the compartment is provided with a block of compressible foam formed with slits for receiving articles to be stored.

8 Claims, 8 Drawing Sheets

(56) References Cited

U.S. PATENT DOCUMENTS

| | | | |
|---|---|---|---|
| 7,143,913 B2 | 12/2006 | Lindsey et al. | |
| 7,150,382 B2 * | 12/2006 | Zickefoose | B62J 11/00 |
| | | | 224/423 |
| 7,748,746 B2 * | 7/2010 | Beiber Hoeve | B62K 11/04 |
| | | | 180/219 |
| 7,793,747 B2 | 9/2010 | Brown | |
| 8,083,111 B2 * | 12/2011 | Lase | B60R 9/065 |
| | | | 224/400 |
| 8,151,925 B2 | 4/2012 | Aramayo, II et al. | |
| 8,172,188 B2 * | 5/2012 | Dubinskiy | B62J 9/001 |
| | | | 224/431 |
| 8,272,310 B2 | 9/2012 | Ingram | |
| 8,925,778 B1 * | 1/2015 | Gordon | B62J 9/00 |
| | | | 224/413 |
| 8,967,315 B1 * | 3/2015 | Lescallett | B62K 11/04 |
| | | | 180/219 |
| 2002/0121534 A1 * | 9/2002 | Hanagan | B62J 9/001 |
| | | | 224/423 |
| 2006/0231308 A1 * | 10/2006 | Takahashi | B62K 5/01 |
| | | | 180/89.1 |
| 2007/0235486 A1 * | 10/2007 | Bernard | B62J 9/001 |
| | | | 224/400 |
| 2016/0010948 A1 | 1/2016 | Gerdes | |

OTHER PUBLICATIONS

Author Unknown; Custom foam in an SKB case for a Ruger .38 Special; date unknown; https://s-media cache-ak0.pinimg.com/564x/dc/0e/d0/dc0ed0c99db37dbf0e38432ba1b67954.jpg.

* cited by examiner

STORAGE COMPARTMENT FOR MOTORCYCLE

CROSS-REFERENCE TO RELATED APPLICATION

This application claims the benefit of U.S. Provisional Patent Application No. 62/561,230, filed on Sep. 21, 2017, and incorporates by reference the entire disclosure thereof.

FIELD OF THE INVENTION

This invention relates to storage compartments, and more particularly to a compartment affixed to a motorcycle for the storage of personal articles such as keys, a wallet, cash, an identification card, a credit card, a flashlight, a firearm, or any of a wide variety of other hand-held articles.

BACKGROUND OF THE INVENTION

A rider of a motorcycle has a number of options for the storage of personal articles. They can be stored on the pockets of the rider's clothing for example, but can be dislodged and lost as a result of inertia when the motorcycle accelerates rapidly or encounters a bump in a roadway. Personal articles can also be stored in saddle bags, which are typically mounted on opposite sides of the motorcycle's rear wheel. However, for removal of an article stored in a saddlebag, the rider will ordinarily need to stop the motorcycle, dismount, and release one or more buckles or other latching devices in order to raise a flap for access to the stored article.

U.S. Pat. No. 7,143,913, granted on Dec. 5, 2006, describes a safe for storing a handgun on a motorcycle. This storage safe is affixed to a part of the motorcycle's frame underneath the seat and forward of th rear wheel. It is closed by a hinged cover, the hinge being located on a side of the safe facing the motorcycle frame. The safe is reachable while the rider is seated. However, the configuration of the cover and the location of the hinge are such that it is exceedingly difficult, if not impossible for a rider to release the cover and remove the stored handgun or other contents of the safe while the motorcycle is in motion, and even when seated on the motorcycle while the motorcycle is stationary. Thus, in order to remove cash for payment of a toll, for example, the rider needs to stop the motorcycle, dismount, and unlock and open the safe. Likewise, in an emergency calling for the use of a flashlight for illumination or signalling, or firearm for defense, the rider will need to stop and dismount in order to gain access to the stored device.

SUMMARY OF THE INVENTION

An objective of this invention is to provide a lockable storage compartment, which is secured to a motorcycle frame at a location such that it can be reached by the rider while mounted and in motion, and configured in such a way that a stored article can be readily removed without dismounting, and removed even while the motorcycle is in motion.

The invention comprises a storage compartment, for attachment to a motorcycle, and can be defined as a combination comprising a motorcycle and the storage compartment. Specifically, the combination comprises a motorcycle having a seat and a compartment for containing a handheld article. The compartment is secured to the motorcycle frame and located on a side of the motorcycle and below the level of the seat. The compartment has a top surface and a hinged closure on the top surface. The closure is positioned to be reached and opened manually by a rider of the motorcycle while mounted on the seat, whereby the rider can remove the handheld article from the compartment while riding.

In a preferred embodiment, the compartment has a first side facing the motorcycle frame and an opposite side facing away from the motorcycle frame. The top surface extends from said first side to the opposite side. The hinged closure has a first edge adjacent the first side and a second edge adjacent the opposite side. A hinge connecting the closure to the top surface allows opening of the closure. The hinge extends along the second edge so that the first edge of the closure moves upward and away from the motorcycle frame as the closure is opened.

The compartment can contain a block of solid, compressible, synthetic resin foam formed with at least one expansible slit for receiving and limiting motion of a hand-held personal article.

The compartment can be secured to a motorcycle frame by bolts engaged with bosses on a back plate forming a part of the compartment. In an alternative embodiment, the back plate can be formed with keyhole-shaped openings for slidably engaging heads of spacers secured by bolts to the motorcycle frame.

DETAILED DESCRIPTION OF THE PREFERRED EMBODIMENTS

Figure 1:
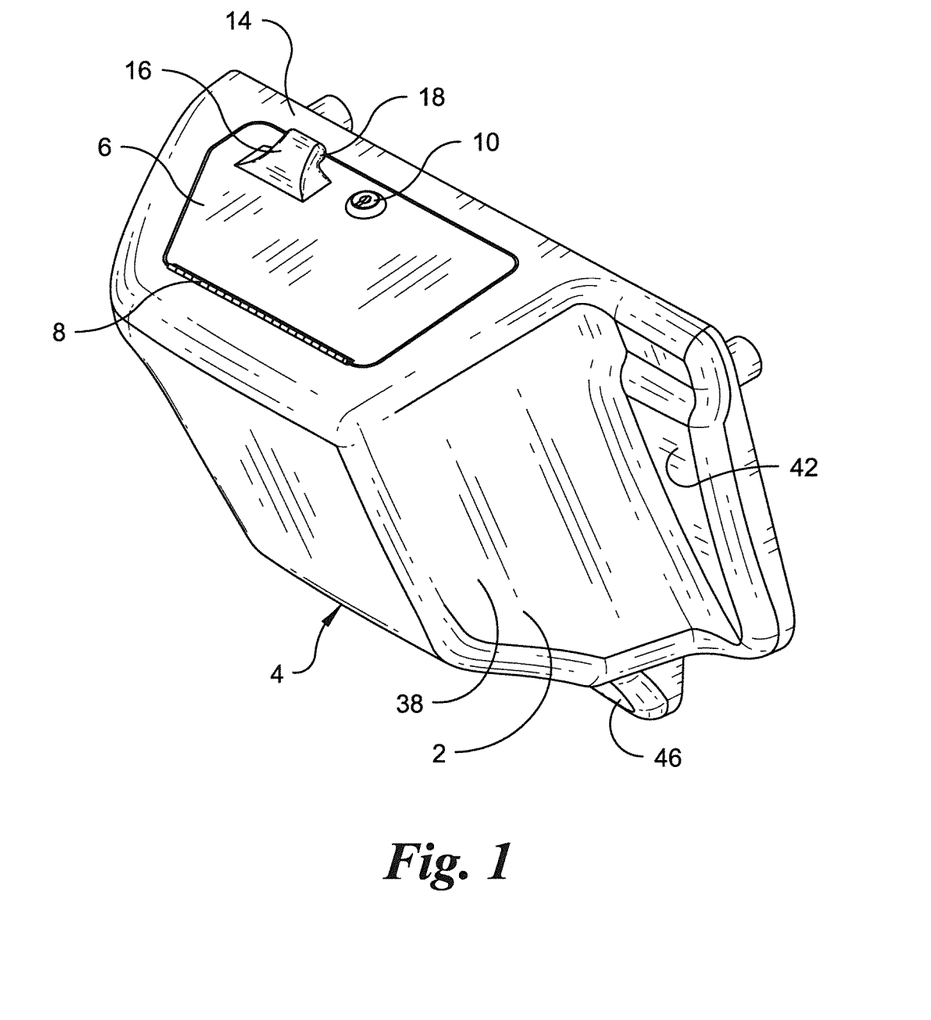
FIG. 1 is a perspective view of the storage compartment in accordance with the invention showing a cover in a closed condition.

The body 2 of the compartment 4, as shown in FIG. 1 is preferably a molded unit and can be composed of an of a wide variety of suitable polymers such as ABS (acrylonitrile-butadiene-styrene), polycarbonate, polypropylene, etc. The compartment has interior space accessible through a closure 6 attached to the main part 2 by a hinge 8 and capable of being secured in a closed condition by a key-operated lock 10. As an alternative, an electronically openable lock can be utilized.

Figure 2:
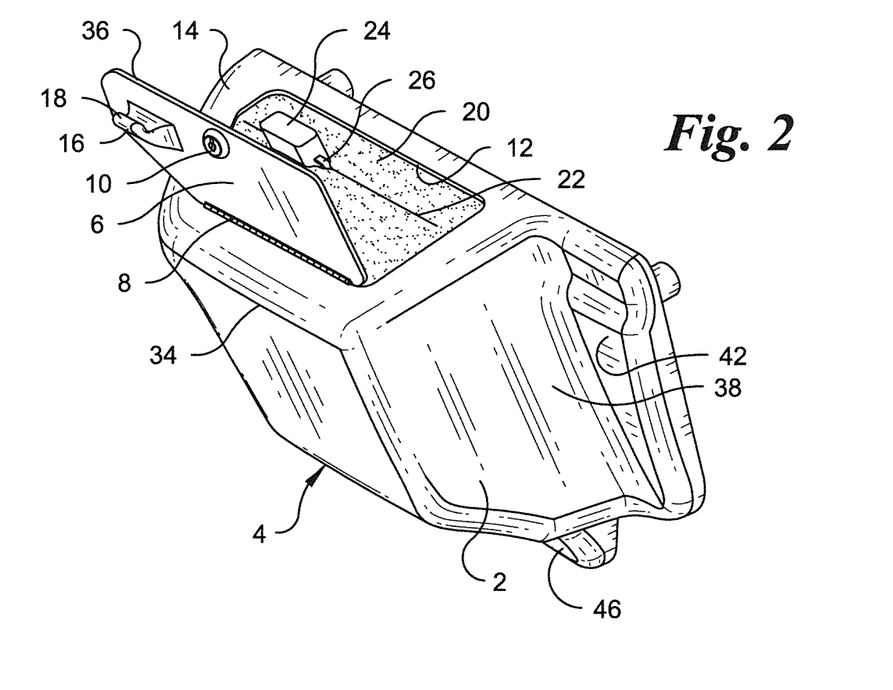
FIG. 2 is a perspective view corresponding to FIG. 1, but showing the cover in an open condition.
Figure 3:
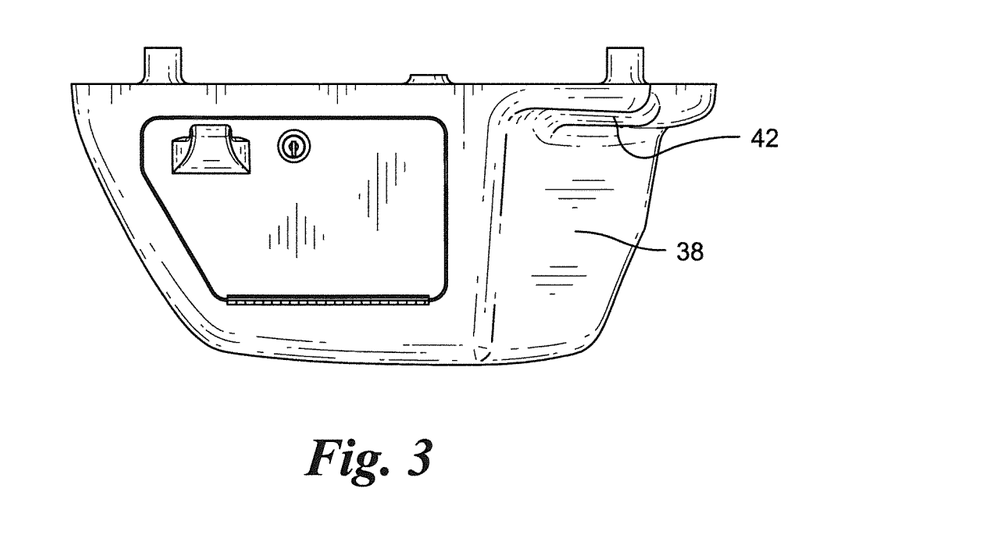
FIG. 3 is a top plan view of the compartment.
Figures 4, 5:
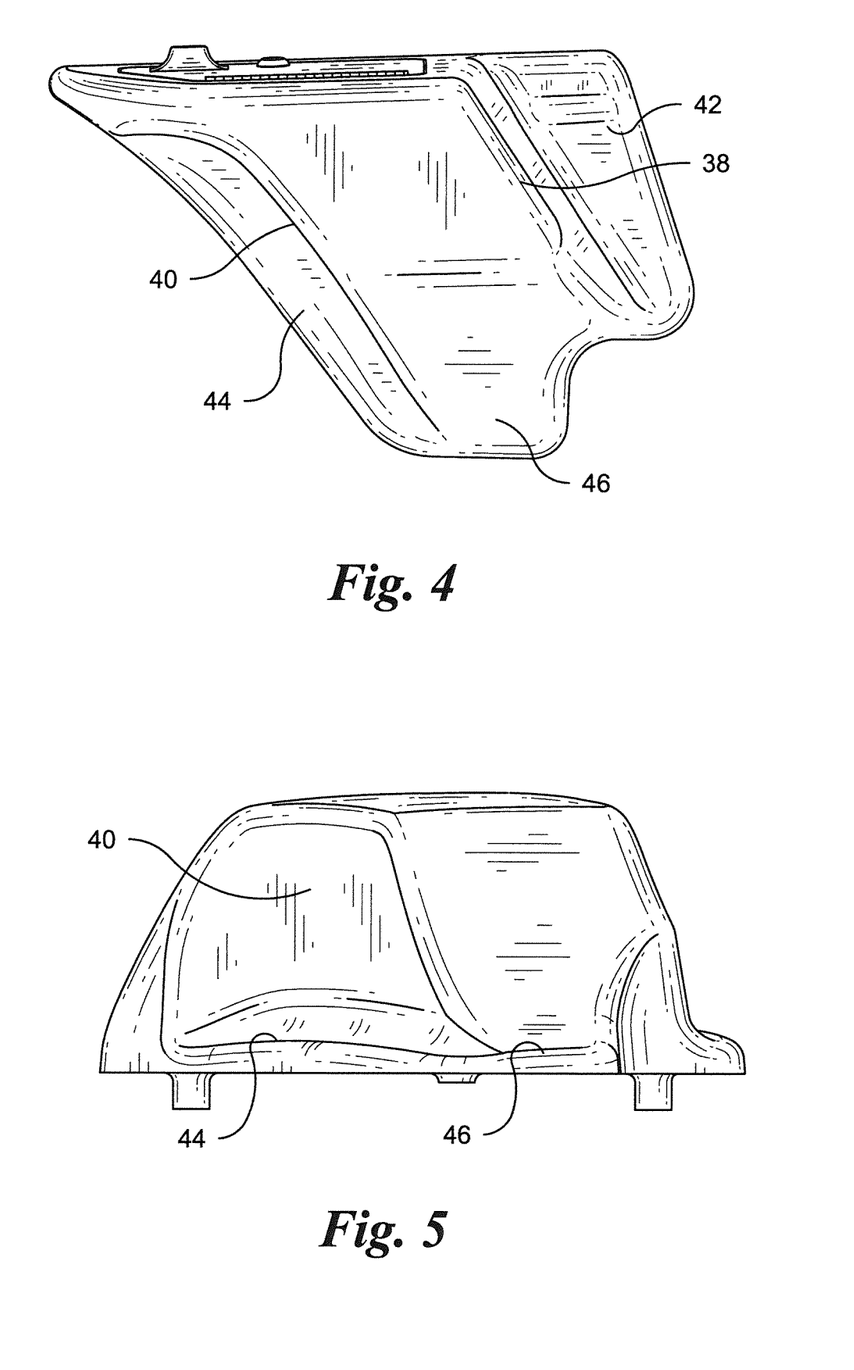
FIG. 4 is a front elevational view of the compartment.
FIG. 5 is a bottom plan view of the compartment.
Figure 6:
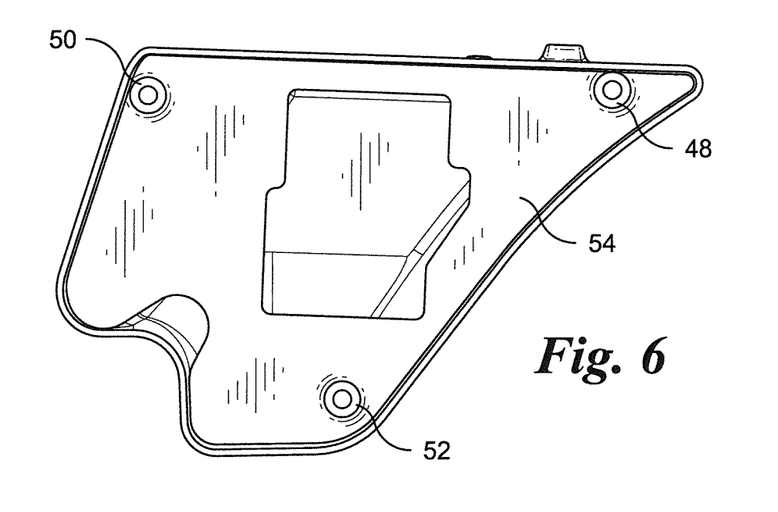
FIG. 6 is a rear elevational view of the compartment.
Figure 7:
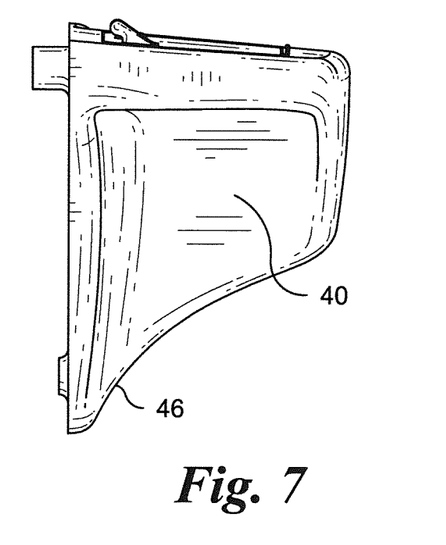
FIG. 7 is a left side elevational view of the compartment.
Figure 8:
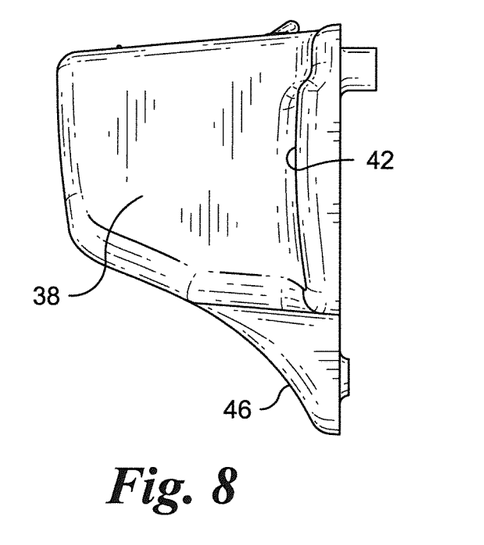
FIG. 8 is a right side elevational view of the compartment.
Figure 9:
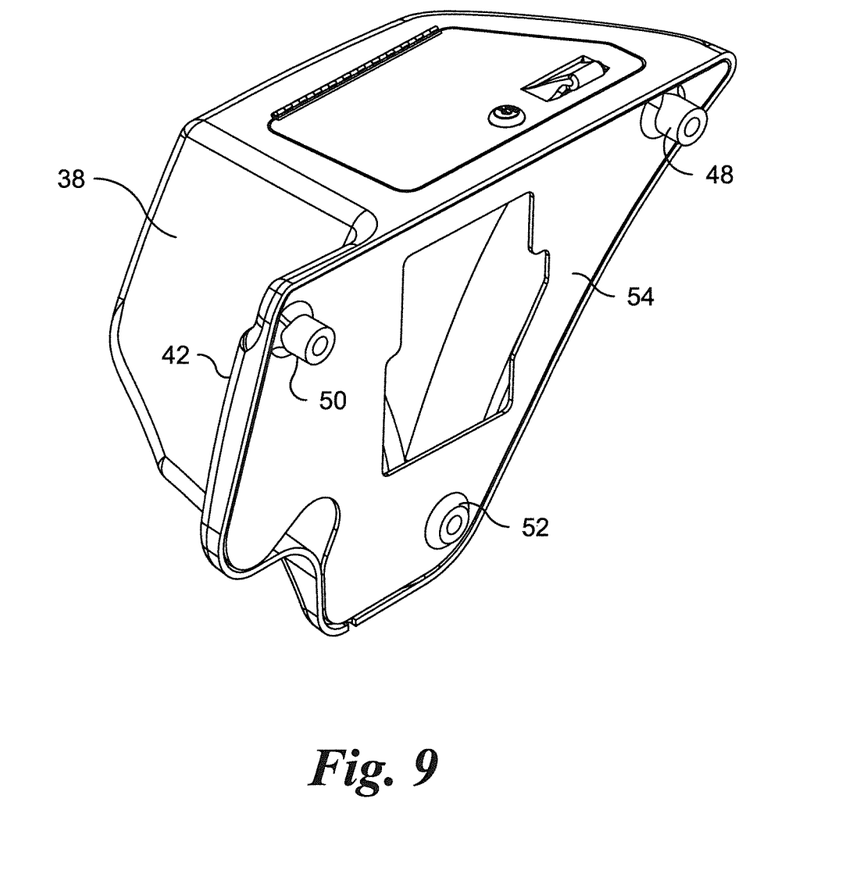
FIG. 9 is a perspective view showing the top and rear of the compartment.

The closure 6 conforms to and fits an opening 12, shown in FIG. 2 and formed in a top surface 14 of the main part of the compartment. A protrusion 16, located on the upper side of the closure at a location spaced laterally from the hinge, is formed with an overhanging part 18 engageable by the rider's finger in order to open the closure when in an unlocked condition.

As shown in FIG. 2, opening the closure reveals the interior space, which is filled with a block 20 of solid, compressible, synthetic resin foam composed of a suitable polymer such as polyurethane. The foam block is formed with one or more elongate, narrow slits, e.g., slit 22 as shown in FIG. 2, for receiving an article to be stored in the compartment. In FIG. 2, the stored article is a handgun. The handgun is held upside-down, and only parts of the grip 24 and the trigger guard 26 are exposed, while the barrel is enveloped by the foam block.

One or more slits can be formed in the foam block and can be configured to receive any of various articles, e.g., keys, a flashlight, a wallet, credit cards, a toll transponder, etc. The slitted, compressible, foam block holds the articles in predetermined positions, keeps them from rattling, protects them from damage, and makes them readily accessible. The foam block can be removed for replacement, and can be interchanged with other foam blocks having different slit configurations.

Figure 10:
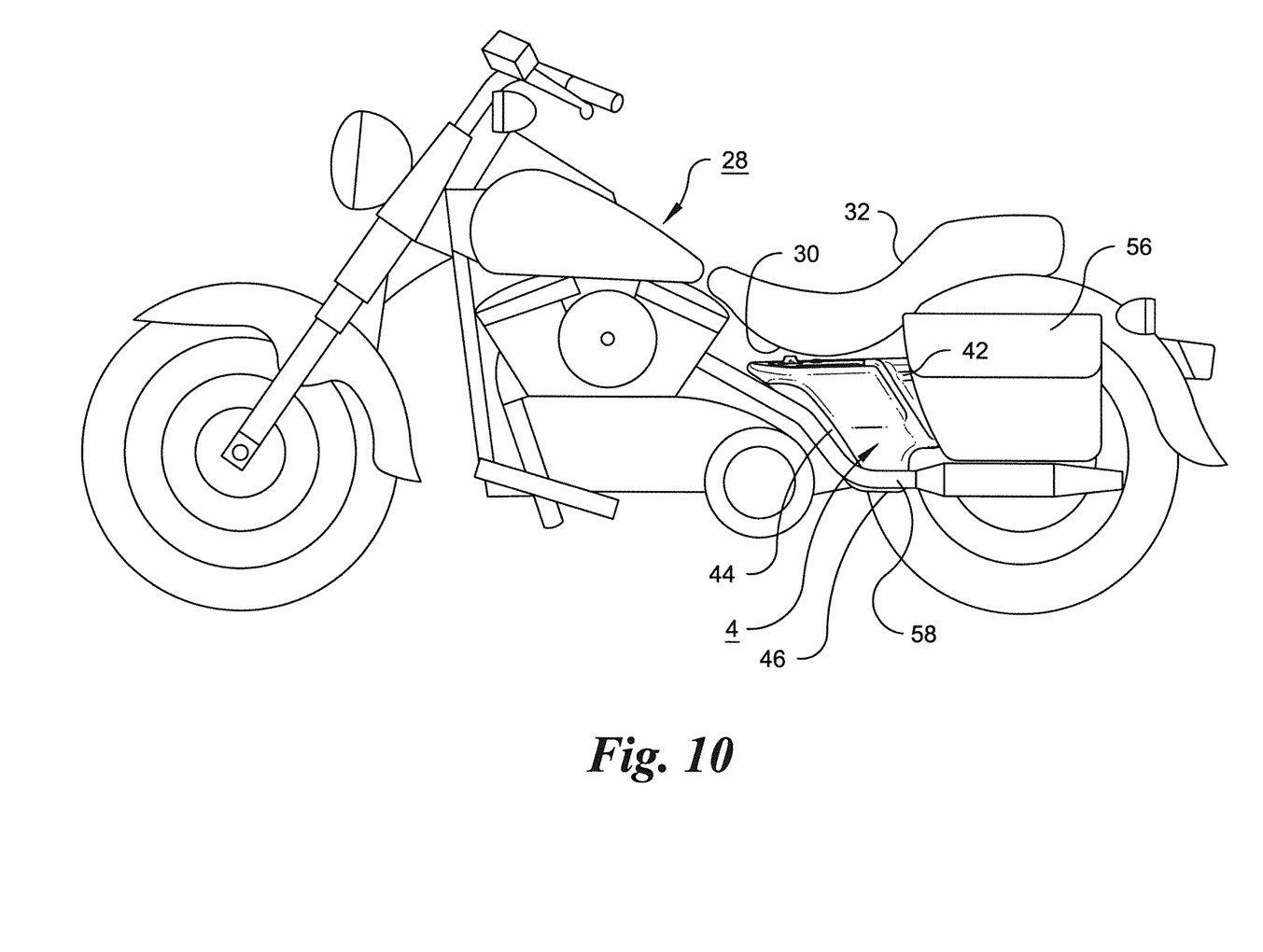
FIG. 10 is a side elevational view showing the compartment attached to a motorcycle.
Figure 11:
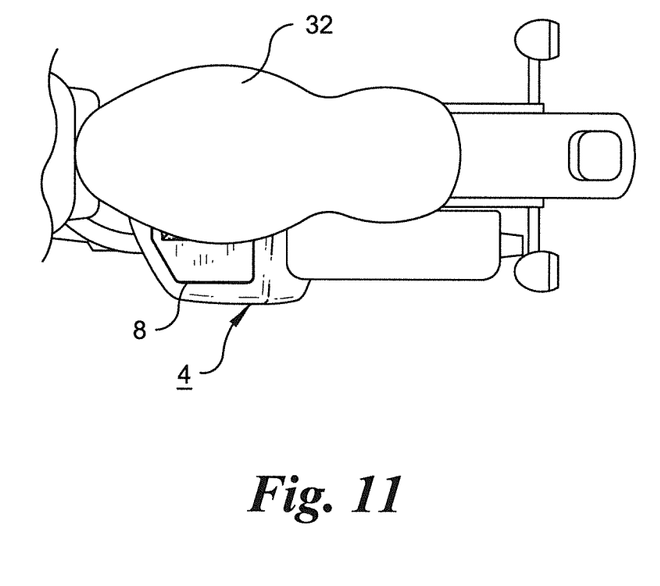
FIG. 11 is a top plan view showing the compartment and a part of the motorcycle of FIG. 9.

As shown in FIGS. 10 and 11, the compartment 4 is mounted on the left side of a motorcycle 28 at a location below the level of the bottom portion 30 of the seat 32.

The position of the closure 6 in the top surface of the compartment makes it possible for the rider to reach the contents while seated on seat 32. Thus, if the key-operated lock 10 is left in an unlocked condition, the rider can manually open the closure and remove an article while seated, and even while the motorcycle is in motion.

The closure is configured so the hinge 8 is positioned adjacent the outboard edge 34 of the top surface 14 and extends parallel to the outboard edge 30. With the closure so configured, the edge 36 of the closure, which is remote from the hinge, moves upward and away from the motorcycle frame as the closure is opened. The compartment should be mounted at a height such that the closure clears the seat when it is being opened. If the hinge were positioned on the opposite edge of opening, contact between the closure and the seat the seat would prevent the closure from moving past the vertical condition. However, because the hinge is positioned adjacent the outboard edge of the top surface 14 of the compartment, the closure can be moved past a vertical condition when opened, and thus remain open.

The compartment is preferably shaped to accommodate motorcycle components and accessories. Thus, as shown in FIGS. 1-9, the molded body 2 of the compartment is formed with an oblique wall 38 facing upward and toward the rear of the motorcycle, and an oblique wall 40 facing downward and toward the front of the motorcycle. A flange 42 extends toward the rear of the motorcycle from wall 38 and a flange 44 extends toward the front of the motorcycle from wall 40. The bottom portion 46 of the compartment is tapered.

The compartment is secured to parts of the frame of a motorcycle by means of bolts (not shown) engaged with bosses 48, 50 and 52 on a back plate 54. The back plate can be formed with openings to accommodate parts protruding from the motorcycle's frame.

When the compartment is mounted on the motorcycle, as shown in FIG. 10, flange 42 accommodates a saddle bag 56 by extending between the bag and a portion of the motorcycle's frame, and flange 44 and tapered portion 46 accommodate an exhaust pipe 58 by extending between portions of the exhaust pipe and the frame.

The positioning of the compartment adjacent the seat as illustrated in FIGS. 10 and 11, and the location of the hinge for the closure, provide for easy access to the contents of the compartment by the motorcycle rider.

As an alternative, a compartment corresponding to the compartment illustrated in FIGS. 1-11 can be mounted on the right-hand side of the motorcycle, and it is possible to provide compartments in accordance with the invention on both sides of the motorcycle.

Figures 12, 13:
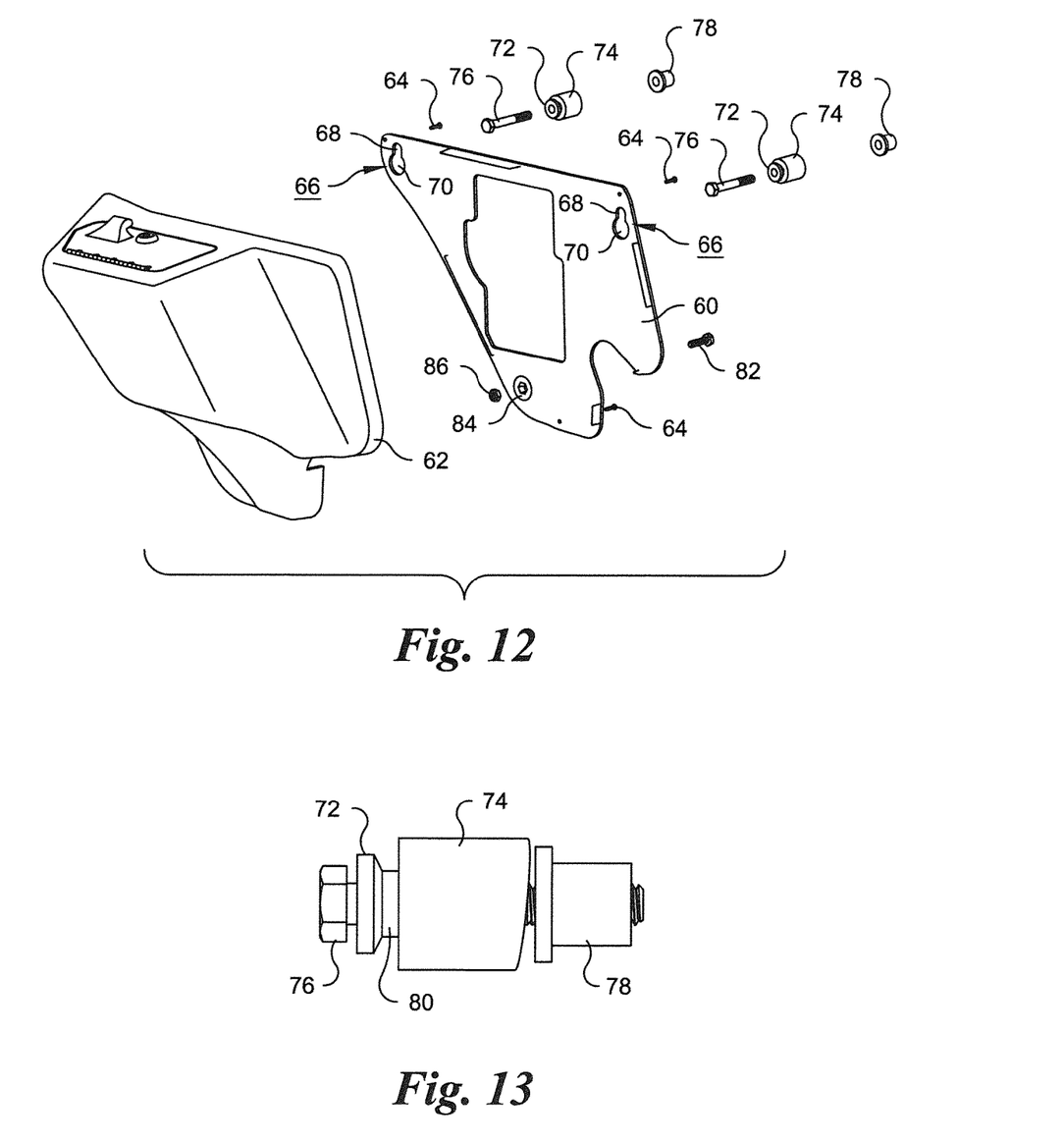
FIG. 12 is an exploded perspective view of another embodiment of the compartment.
FIG. 13 is an elevational view of a spacer assembly utilized in the embodiment illustrated in FIG. 11.

In the embodiment illustrated in FIGS. 12 and 13, a back plate 60, which is secured to a molded compartment body 62 by screws 64, is formed with a pair of keyhole-shaped openings 66, each having a narrow slot 68 extending upward from a wider, circular part 70. The keyhole-shaped openings are positioned adjacent opposite upper corners of the back plate 60, and receive heads 72 of spacers 74, which are attached to a motorcycle frame by bolts 76 and nuts 78. As shown in FIG. 13, the head 72 is connected to the body of the spacer 74 by a neck 80 sized to fit a slot 68 of a keyhole-shaped opening. The head 72 can fit though the circular part 70, but is wider than the slot 68.

The spacers can be supplied in various lengths, depending on the model of the motorcycle. After the spacers are attached to the motorcycle frame, the compartment is installed by positioning it to cause the heads of the spacers to enter the circular parts 70 of the keyhole-shaped openings, and then moving the compartment downward so that the necks of the spacers are received in slots 68. The compartment is then secured to the frame by passing a bolt 82 through a hole 84 in the back plate and securing the bolt with a nut 86. A part of the hole 84 on the side of the back plate facing the interior of the compartment preferably has a hexagonal shape to prevent rotation of the nut, and a shoulder against which the nut bears when the bolt 82 is tightened. As an alternative, the back plate can be formed with a threaded hole.

Modifications can of course be made to the compartment described, not only in its shape, but also in the manner and location in which it is secured to the motorcycle, without departing from the scope of the invention as defined in the following claims.

What is claimed is:

1. A combination comprising a motorcycle having a seat and a compartment for containing a handheld article, the compartment being secured to the motorcycle frame and located on a side of the motorcycle and below the level of said seat, said compartment having a top surface, a first side facing said motorcycle frame and being located at least in part underneath said seat, and an opposite side facing away from said motorcycle frame, said top surface extending from said first side to said opposite side, and a hinged closure on said top surface, said hinged closure having a first edge adjacent said first side and a second edge adjacent said opposite side, and including a hinge for connecting said closure to said top surface and allowing opening of said closure, said hinge extending along said second edge whereby the first edge of the closure moves upward and away from the motorcycle frame as the closure is opened, the compartment being mounted at a height such that said first edge clears said seat when the hinged closure is being opened, and being secured to the motorcycle frame at a position such that said closure can be reached and opened manually by an operator of the motorcycle mounted on said seat while operating the motorcycle, whereby the operator can remove said handheld article from the compartment while safely driving the motorcycle on a roadway.

2. The combination according to claim 1, wherein said compartment contains a block of solid, compressible, synthetic resin foam, said block of foam being formed with at least one expansible slit for receiving and limiting motion of a hand-held personal article.

3. The combination according to claim 1, in which:
said motorcycle is fitted with a plurality of spacers extending from a frame thereof below the seat, each spacer having a body part, a neck, and a head connected to the body part by the neck, the neck being narrower than the head and narrower than the body part;
said compartment has a first side facing said motorcycle frame and an opposite side facing away from said motorcycle frame, and a back plate on said first side, said back plate having a plurality of keyhole-shaped openings each having a wider part sufficiently large to allow a head of one of said spacers to pass through, and a slot extending from said wider part, the slot being narrower than the head of said one of said spacers but sufficiently wide to receive the neck of said one of said spacers; and
said compartment is secured to the motorcycle frame by the engagement of necks of said spacers with slots of said keyhole-shaped openings.

4. The combination according to claim 3, in which the slot of each of said keyhole-shaped openings extends upward from the wider part thereof.

5. The combination according to claim 3, in which the wider part of each of said keyhole-shaped openings is circular in shape.

6. The combination according to claim 3, in which the wider part of each of said keyhole-shaped openings is circular in shape, and in which the slot of each of said keyhole-shaped openings extends upward from the wider part thereof.

7. The combination according to claim 3, including a fastener connecting said back plate to the frame of the motorcycle and preventing sliding movement of said slots relative to said spacers.

8. The combination according to claim 1, in which said first edge of the hinged closure being laterally spaced from said first side of the compartment toward said opposite side of the compartment.

* * * * *